United States Patent [19]

Gardner

[11] Patent Number: 5,039,113
[45] Date of Patent: Aug. 13, 1991

[54] SPIRAL GROOVE GAS LUBRICATED SEAL

[75] Inventor: James F. Gardner, Exeter, R.I.

[73] Assignee: EG&G Sealol, Inc., Providence, R.I.

[21] Appl. No.: 466,656

[22] Filed: Jan. 17, 1990

[51] Int. Cl.⁵ .............................................. F16J 15/34
[52] U.S. Cl. .................................. 277/81 R; 277/85; 277/96.1
[58] Field of Search ...................... 277/71, 81 R, 81 S, 277/81 P, 84, 85, 93, 93 SD, 96, 96.1

[56] References Cited

U.S. PATENT DOCUMENTS

| | | | |
|---|---|---|---|
| 3,081,745 | 3/1963 | Hurley | 277/81 P |
| 3,575,424 | 4/1971 | Taschenberg | 277/71 |
| 3,953,038 | 4/1976 | Ludwig | 277/93 R |
| 3,989,425 | 11/1976 | Walker et al. | 277/81 P X |
| 4,114,899 | 9/1978 | Külzer et al. | 277/85 X |
| 4,212,475 | 7/1980 | Sedy | 277/93 SD X |
| 4,290,613 | 9/1981 | Scott | 277/96.1 |
| 4,304,408 | 12/1981 | Greenwalt | 277/189 X |
| 4,423,879 | 1/1984 | Takenaka et al. | 277/96.1 |
| 4,700,953 | 10/1987 | Kuusela et al. | 277/81 R X |
| 4,768,790 | 9/1988 | Netzel et al. | 277/81 R |
| 4,889,348 | 12/1989 | Amundson | 277/81 R X |
| 4,889,349 | 12/1989 | Müller | 277/85 |

FOREIGN PATENT DOCUMENTS

| | | | |
|---|---|---|---|
| 690413 | 7/1961 | Canada | 277/81 S |
| 1078164 | 3/1984 | U.S.S.R. | 277/81 R |
| 1401220 | 6/1988 | U.S.S.R. | 277/81 R |
| 933389 | 8/1963 | United Kingdom | 277/81 R |
| 2013288 | 8/1979 | United Kingdom | 277/81 R |

Primary Examiner—William A. Cuchlinski, Jr.
Assistant Examiner—Scott Cummings
Attorney, Agent, or Firm—Finnegan, Henderson, Farabow, Garrett & Dunner

[57] ABSTRACT

A dry running gas seal includes a stationary seal ring carrier attached to the machine body wherein the stationary seal ring carrier has an annular pocket, a stationary seal ring held in the pocket, a rotary seal ring carrier fixedly attached to the shaft wherein the rotary ring carrier has an annular pocket, a rotary seal ring held in the pocket wherein the rotary seal ring has a sealing face held adjacent to the stationary seal ring and grooves formed on the sealing face of the rotary seal ring wherein the grooves have an average angle of 5 to 15 degrees. The seal further comprises: an annular notch formed in a portion of the stationary seal ring axially away from the rotary seal ring, a "T" shaped insert extending into the notch, and an "O" ring disposed between the insert and the inner walls of the pocket in the stationary seal ring carrier. The seal further includes an annular groove formed in the radially inner wall of the rotary seal ring carrier, and a finger spring disposed in the groove.

12 Claims, 10 Drawing Sheets

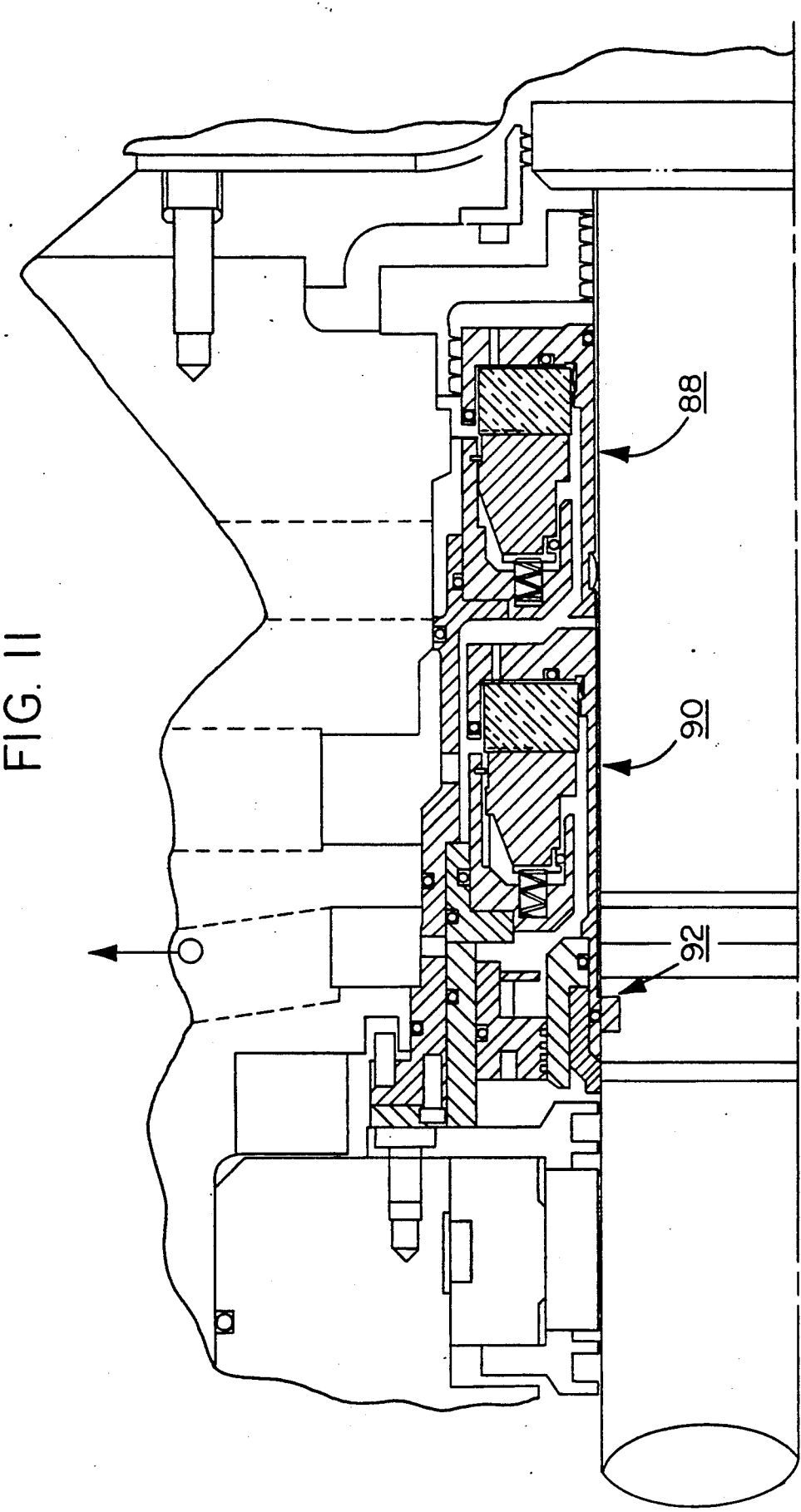
FIG. II

SPIRAL GROOVE GAS LUBRICATED SEAL

BACKGROUND OF THE INVENTION

1. Field of the Invention

The present invention relates to a gas seal, and more specifically, to a gas seal with spiral grooves.

2. Description of the Related Art

Dry-running gas lubricated seals provide significant economic benefits over the prior art oil seals which consume significantly more power due to the greater viscosity of oil as compared to gas. Furthermore gas seals do not require expensive apparatus for cleaning and cooling the oil.

One of the first working concepts for a combination hydrostatic and hydrodynamic gas seal was discussed in U.S. Pat. No. 3,499,653 to Gardner. This seal has a spiral groove pattern on one of the sealing faces which allows gas pressure to provide hydrostatic separation and rotation to provide hydrodynamic separation of the sealing faces. U.S. Pat. Nos. 4,212,475 to Sedy and U.S. Pat. No. 4,768,790 to Netzel et al. discuss improvements and refinements to spiral groove gas seals.

However, dry-running gas seals exhibit some areas of performance which are less than optimal. First, improvement of the dynamic tracking of the seal faces during rotation is needed to allow the seals to ride on a thinner gas film and track the runout on the face of the rotating ring. Runout on the faces of rotating rings is typically 0.0007 to 0.0030 inch T.I.R., which is considerably greater than the 100 to 300 micro inch gas film on which the seal faces ride. Therefore, it is critical for the seal faces to be able to take on a swash plate action (i.e., a simultaneous oscillation about two axes in the sealing face) in order to follow the total runout on the rotating ring. It is this ability to takeon the swash plate action that is called dynamic tracking. The dynamic tracking capabilities of the seal faces are affected by the drag imparted on the seal ring by "O" ring forces and by the mass of the axially mobile stationary seal structure.

In a conventional gas seal, a "O" ring is placed between the stationary seal ring and the stationary seal ring carrier, and the seal ring is typically manufactured from materials having low thermal expansion coefficients, such as carbon graphite, silicon carbide and tungsten carbide. The ring carrier in such a conventional gas seal is fabricated from metal, such as stainless steel, Inconel 625 or another metal having good corrosion resistance, temperature resistance and the required strength. These metals from which the carriers are formed have coefficients of expansion approximately three times that of the typical seal ring materials.

The seal rings are mounted within a stationary housing and mounted over a metal balance diameter which serves to center the seal ring with a clearance used to compensate for differential thermal growth between the seal ring and the balance diameter. For a seal with a 4.625 inch balance diameter, a diametrical clearance of 0.015 to 0.019 inches would be common. During operation, the seal assembly becomes hot, with temperatures up to 350° to 400° F. not uncommon. When the assembly heats, the balance diameter expands relative to the seal ring and then centers the seal ring.

However, differential thermal expansion between the balance diameter and the seal ring will create variability in the squeeze force on the "O" ring. This variability will adversely effect the dynamic tracking of the stationary seal ring, since the stiffness (i.e., the force preventing opening and closing) of the sealing faces imparted by the "O" ring may be as high as 100,000 pounds per inch.

Attempts have been made to eliminate the differential thermal squeeze on the "O" ring by placing it between a metallic "O" ring holder and the metallic carrier. However, these devices, such as the one in Netzel et al., have significant mass, and therefore their inertia might negatively affect the dynamic tracking capability of the sealing face.

A further problem of dynamic tracking is associated with placement of the seal ring carrier on a high speed shaft. Typically, an alloy such as 4340 is used for the shaft itself which has a different thermal expansion coefficient than the rotary ring carrier. Although not as great as the differential thermal expansion between the stationary seal ring and the carrier, the loosening of the rotary seal ring carrier on the shaft is of greater concern due to the high speed of rotation. Typically, for a 4.00 inch shaft of 4340 with a stainless steel rotary ring carrier, approximately 0.003 inches loosening at 400° F. results from differential thermal expansion. At a typical rotating shaft speed of 16,000 rpm, a ten pound carrier creates centrifugal unbalanced force of 218 pounds.

Additional loosening of the carrier on the shaft occurs due to differential centrifugal expansion. It is well known that a hollow sleeve grows centrifugally at a much greater rate than a solid shaft. This factor gives an additional degree of loosening at high speed. For the same 4.00 inch shaft at 16,000 rpm, an additional loosening of 0.0015 to 0.002 inches would be experienced.

In the art, shrink fits have often been used to secure seal carriers on a rotating shaft in order to eliminate the loosening due to thermal and centrifugal effects. However, the shrink fit makes installation and removal of seal assemblies very difficult in many cases.

Another area where improvement in gas seal performance is desirable concerns gas film thickness. Conventional spiral groove gas seals tend to exhibit a substantial difference in gas film thickness between hydrostatic (i.e., non-rotating) and hydrodynamic (rotating) operation due to the significant pumping force provided by the spiral grooves. The larger film thickness at high rotations allows for greater leakage across the sealing faces than would otherwise be desired.

A final area of sub-optimal performance in current gas seal design relates to the safety problems present in conventional gas seals. A conventional seal holds the rotary seal ring with pins passing from the rotary seal ring carrier into the seal ring. The pins can cause significant stress concentration in the rotary seal ring and lead to fracture of the ring. Furthermore, the problem is accentuated in the conventional gas seal design by the lack of any retaining structure for the rotary seal ring should catastrophic failure occur. At operating speeds up to 16,000 rpm, a fractured ring can cause significant damage to the machine in which it is operating as well as expensive down time in repair.

SUMMARY OF THE INVENTION

An object of the invention is to provide an improved seal. A further object is to provide a seal operating on a gas film and having less leakage. A still further object the invention is to provide increased dynamic tracking capability of the sealing faces. It is still a further object of the invention to provide a superior and safer means for retaining the rotary seal ring.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, the invention comprises a dry running gas seal for sealing along a shaft within a machine body, the seal comprising: a stationary seal ring carrier attached to the machine body, the stationary seal ring carrier having an annular pocket having walls; a stationary seal ring held in the pocket of the stationary seal ring carrier; a rotary seal ring carrier fixedly attached to the shaft, the rotary ring carrier having an annular pocket having walls; a rotary seal ring held in the pocket of the rotary seal ring carrier, the rotary seal ring having a sealing face held adjacent to the stationary seal ring; and grooves formed on the sealing face of the rotary seal ring, wherein the grooves have an average angle of 5 to 15 degrees.

To achieve the objects and in accordance with the purpose of the invention, as embodied and broadly described herein, the seal further comprises: an annular notch formed in a portion of the stationary seal ring axially away from the rotary seal ring; an insert having an axially parallel portion and an axially orthogonal portion, the axially orthogonal portion extending into the notch; and an "O" ring disposed between the axially orthogonal portion and one of the walls of the pocket in the stationary seal ring carrier.

To achieve the objects and in accordance with the purpose of the invention, as embodied and broadly described herein, the seal further comprises: an annular groove formed in a radially inner one of the walls of the rotary seal ring carrier; and a finger spring disposed in the groove.

It is to be understood that both the foregoing general description and the following detailed description are exemplary and explanatory only and are not restrictive of the invention as claimed.

The accompanying drawings, which are incorporated in and constitute part of the specification, illustrate one embodiment of invention and together with the description, serve to explain the principles of the invention.

BRIEF DESCRIPTION OF THE DRAWINGS

FIG. 11 is a partial cross sectional view of a tandem sealing system using two gas seals according to the invention.

DESCRIPTION OF THE PREFERRED EMBODIMENT

Reference will now be made in detail to the presently preferred embodiment of the invention, an example of which is illustrated in the accompanying drawings. Wherever possible, the same reference numbers will be used throughout the drawings to refer to the same or like parts.

Figure 1:
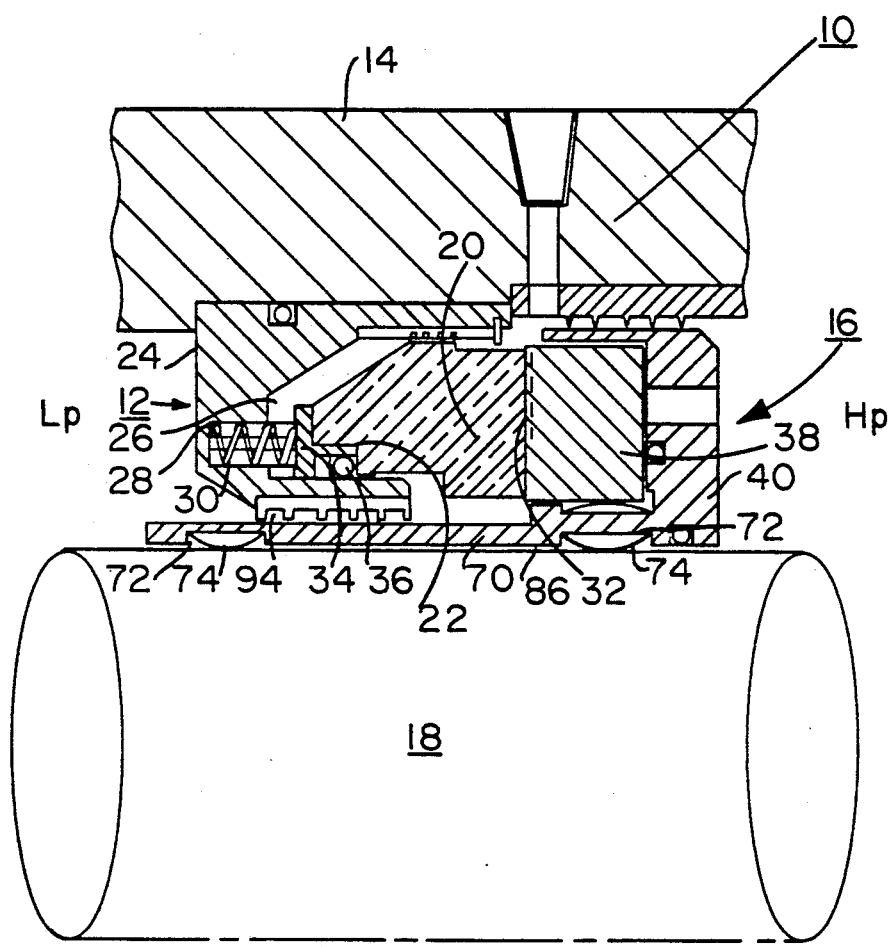
FIG. 1 is a partial cross-section of a gas seal according to the invention.

FIG. 1 shows a dry-running gas seal shown generally as 10, including stationary seal ring assembly 12 attached to machine body 14 and rotary seal ring assembly 16 attached to the rotary shaft 18. The gas seal is used to seal a process gas (indicated as "Hp" in FIG. 1) on the radially outward side of the seal from a low pressure area (indicated as "Lp" in FIG. 1) on the radially inward side of the seal.

Stationary seal ring assembly 12 includes stationary seal ring 20, which is usually made of carbon graphite. The stationary seal ring has annular notch 22 formed in the radially inner back portion.

Stationary seal ring housing 24, which holds the stationary seal ring in annular pocket 26, is preferably made of Inconel 625 or stainless steel. The pocket may be formed by turning or other methods well known in the art. A series of holes 28 are bored into the bottom of pocket 26. Springs 30 fit into those bore holes and serve to engage sealing face 32 with the rotary seal ring assembly when the seal is not pressurized.

Figure 2A:
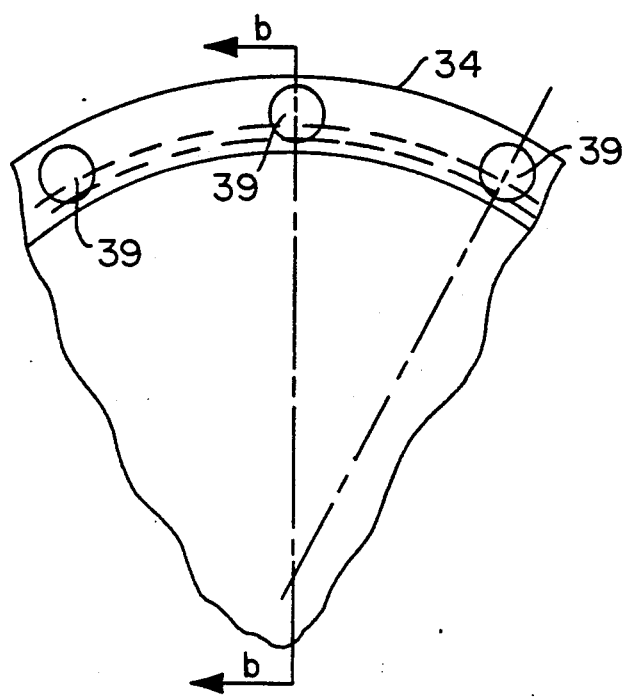
FIG. 2 (a) and (b) depict an "O" ring holder according to the invention.
Figure 2B:
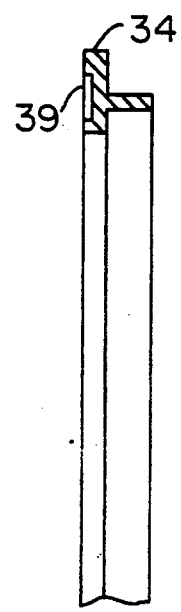

In accordance with the invention, an "O" ring holder is incorporated into the stationary seal ring assembly which minimizes the drag placed on the stationary seal ring by the "O" ring and thus enhances dynamic tracking capability. The assembly 12 includes "O" ring holder 34 and "O" ring 36. FIG. 2 shows an enlarged view of the holder 34. The holder incorporates circular pockets 39 for the purpose of guiding springs 30 between the holes 28 of the stationary seal ring carrier 24 and the stationary seal ring 20. Holder 34 has a "T" shaped cross-section which enhances the stiffness of the holder and allows the thickness to be reduced. As shown, the "T" shaped "O" ring holder includes an axially orthogonal portion against which springs 30 act and an axially parallel portion which is perpendicular to the orthogonal portion and extends into the notch 22. The "T" shape allows the mass and momentum to be reduced and dynamic tracking improved.

As shown in FIG. 1, the "O" ring holder extends into notch 22 and allows the stationary seal ring 20 to axially overlap the "O" ring 36, thereby improving axial compactness of the assembly. Additionally, the "O" ring holder improves dynamic tracking. The "O" ring is radially squeezed between two metal sections having the same or approximately the same coefficients of thermal expansion. In the preferred embodiment, "O" ring holder 34 and seal ring housing 24 are made of the same or similar metals. The thermal expansion of the metallic pieces therefore does not create a change in the "O" ring radial squeeze. Therefore, a very light original radial squeeze, typically 4 to 7% of the "O" ring cross section, may be used. This reduces the axial drag forces imparted by the "O" ring holder to the stationary seal ring and thus enhances dynamic tracking capability.

A small clearance is placed between the outer wall of the axially parallel portion of the "O" ring holder 34 and the wall of the notch 22 of the stationary seal ring 20 so that there is no friction between the surfaces and so that the holder cannot pull on the seal ring. The "O" ring 36 is radially squeezed between the holder 34 and the housing 24 and effectively holds the holder in place and keeps it spaced from the seal ring. Therefore, for any axial vibration or run out of the rotating ring assembly 16, the stationary seal ring is free to move forward and is not axially constrained by friction or by "O" ring forces, which are relatively high. Experiments have shown that for a seal having a 4.00 inch balance diameter, an "O" ring at 1,000 psig squeeze pressure can exhibit a stiffness of over 100,000 pounds per inch. Therefore, movement of the "O" ring 0.002 inches would require a force of about 200 pounds which could substantially limit the dynamic tracking of the seal ring unless isolated from the force as in the present invention. Axial "O" ring damping forces are also quite significant, with values of 10 to 25 pound-seconds per inch being typical. The force to overcome damping for a high speed seal is on the same order as that for overcoming stiffness, and therefore isolation of these forces from the seal ring is also an important benefit of the invention.

The design for the new "O" ring holder provides another beneficial feature. If the stationary seal ring 20 moves forward in order to accommodate rotating seal ring assembly motion and thereby separates slightly from the "O" ring, gas will flow between the "O" ring holder and the back of the seal ring and briefly beyond the "O" ring. Associated with this gas flow would be a pressure drop, and thus, there would be a hydrostatic pressure differential, in the axial direction which would cause the "O" ring holder and the "O" ring to almost instantly move forward to follow the axial motion of the seal ring. The magnitude of this available force is such that there would be no significant separation between the stationary seal ring and the "O" ring for any appreciable period of time.

Figure 3B:
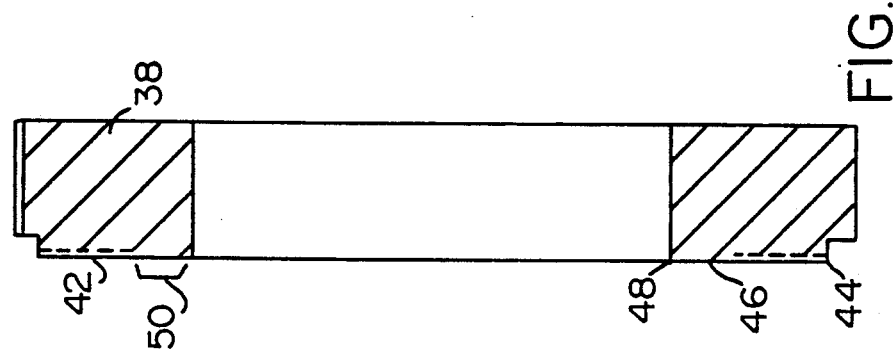
FIG. 3 (a) and (b) depict a rotary seal ring as used in the seal of FIG. 1.
Figure 3A:
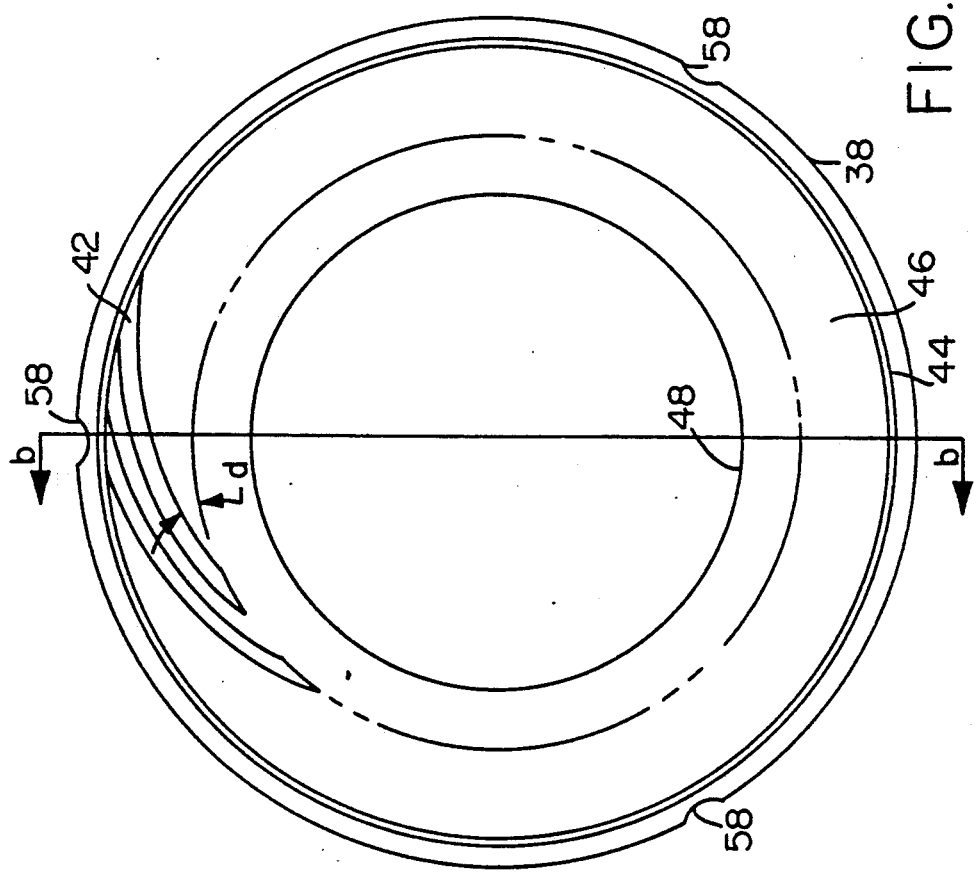
Figure 4:
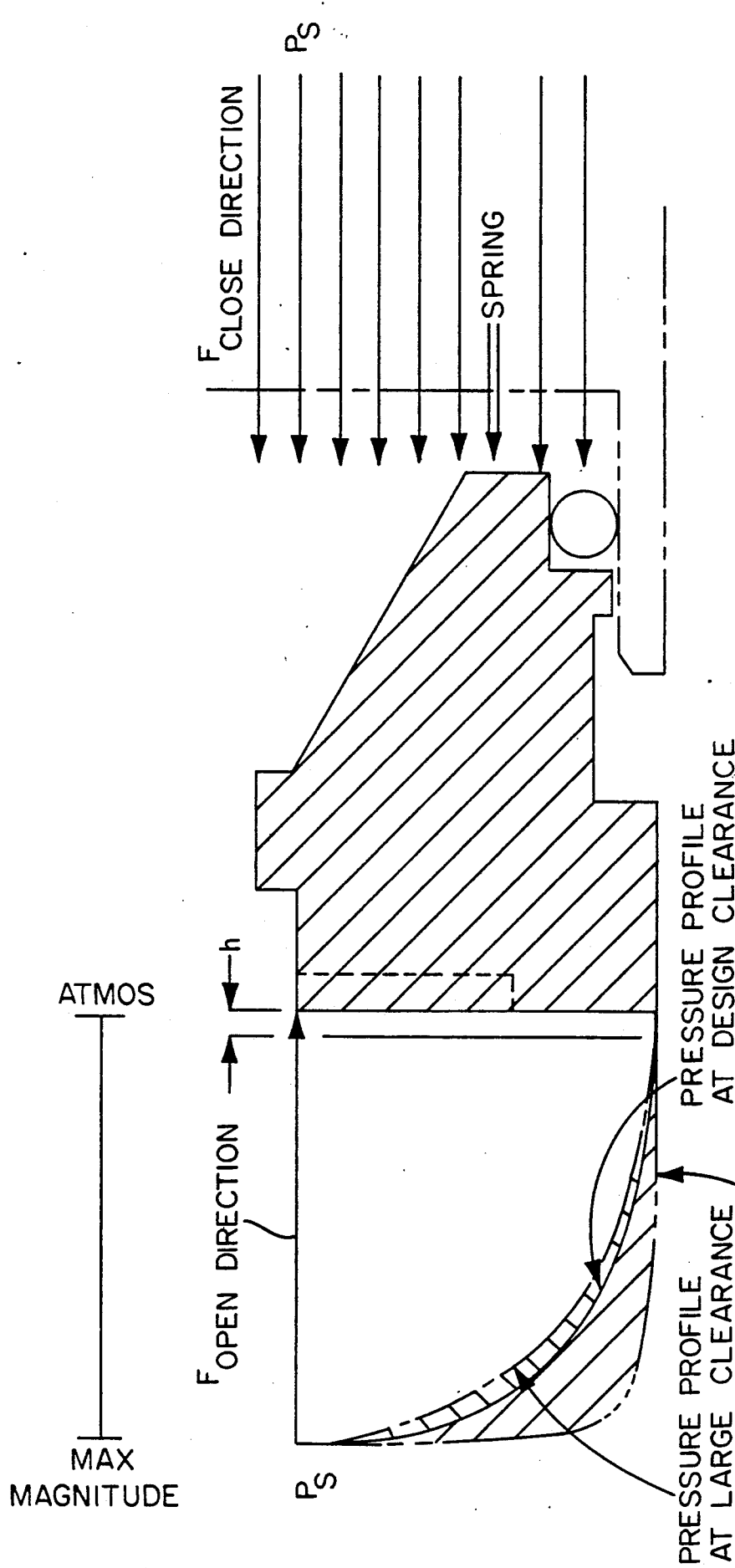
FIG. 4 is a graphic representation of hydrostatic opening forces.
Figure 5:
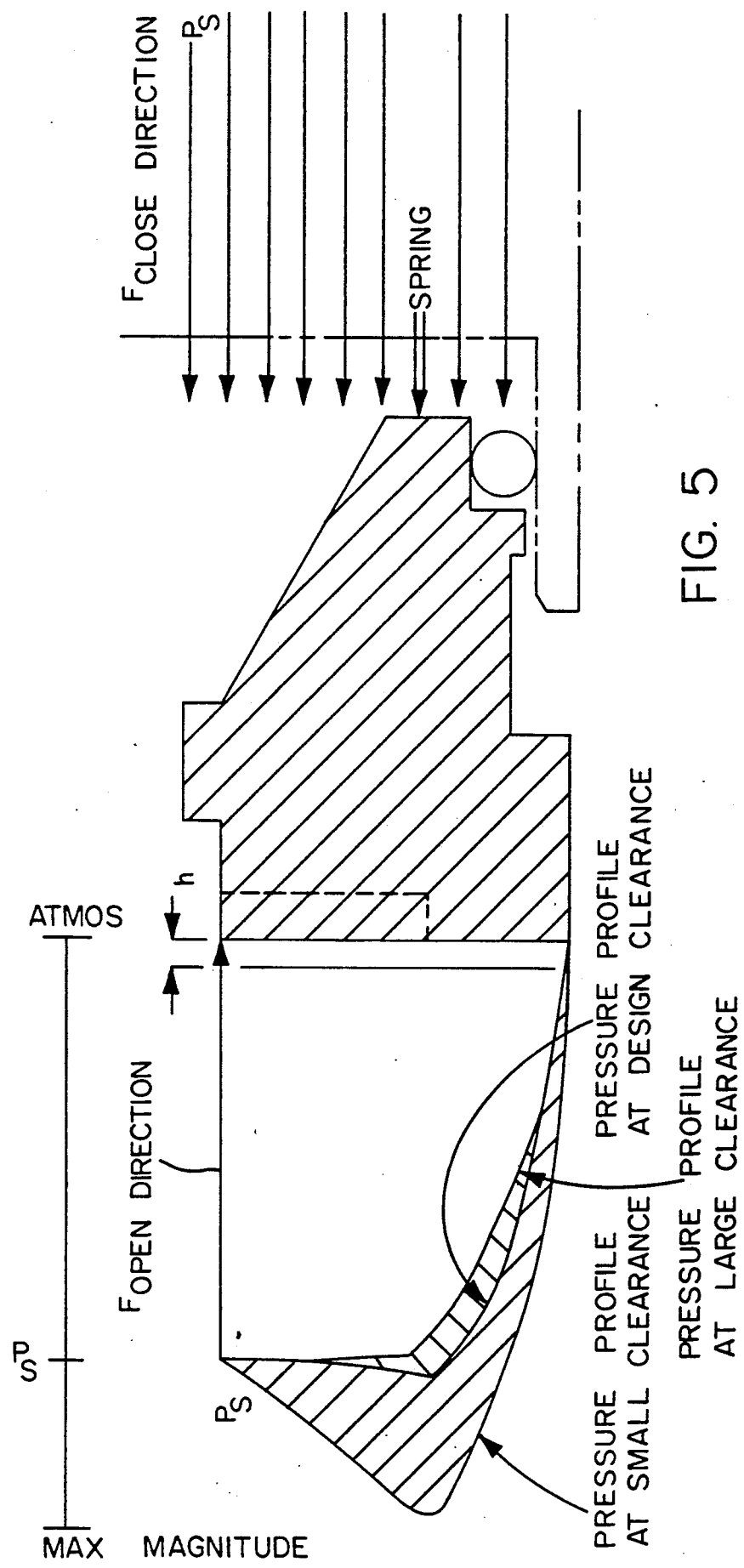
FIG. 5 is a graphic representation of hydrodynamic opening forces.

In the gas seal of FIG. 1, the rotary seal assembly 16 has a rotary seal ring 38 and a rotary seal carrier 40 for holding the seal ring. The rotary seal ring is typically made of silicon carbide. As can be seen in FIG. 3, the face of the rotary seal ring in the rotary seal ring assembly has spiral grooves 42 formed thereon. The grooves serve to provide both hydrostatic and hydrodynamic forces for separating the sealing faces. When exposed to a pressurized gas, the gas enters the grooves and provides an opening force. That opening force is balanced by the gas pressure acting on the back of the seal ring which tends to close the sealing faces. FIG. 4 shows a representation of the hydrostatic forces on a non-rotating seal as a function of clearance between the sealing faces. Once the shaft begins to rotate, the grooves perform a pumping function which increases the pressure and pressure variation across the sealing faces, and thus increases the opening force as compared to the hydrostatic case. FIG. 5 shows a typical hydrodynamic pressure profile for differing seal face clearances.

Figure 6:
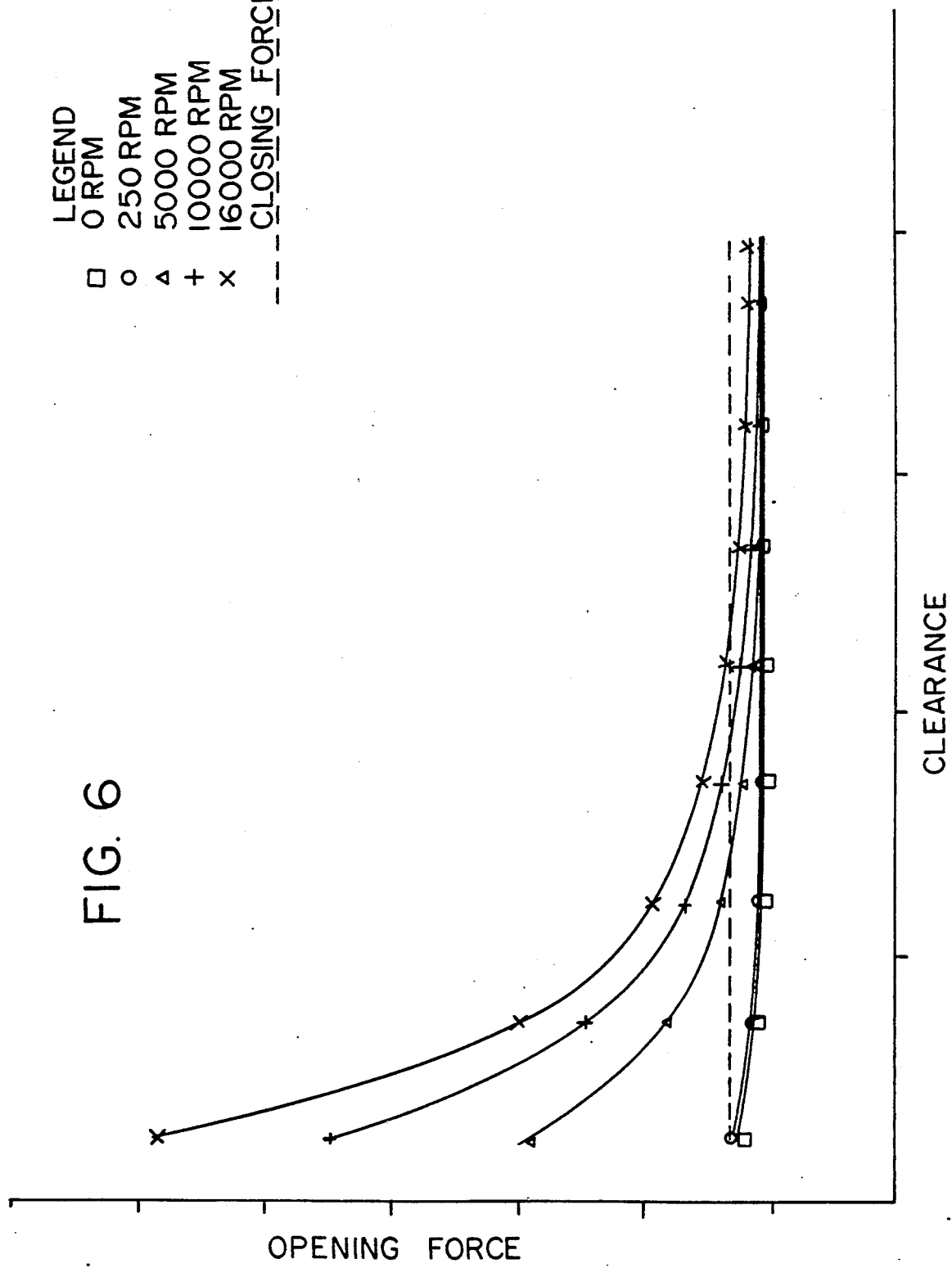
FIG. 6 is a typical force vs. clearance graph.

As shown in FIGS. 4 and 5, as the gap between the sealing faces closes, the force and pressure available to separate the faces increase. As the gap opens, the force and pressure available to separate the faces decrease. Therefore, the sealing faces will hold a clearance which oscillates around the clearance required for a force balance between the opening forces and the closing forces. A typical force versus separation curve is shown in FIG. 6. The steady state clearance obtained during operation of the seal is shown by the point at which the opening force (solid line) and closing force (broken line) curves intersect. As can be seen in FIG. 6, the clearance at which the intersection occurs increases with the increasing rotational speed of the shaft. Additionally, the force available to resist closing of the sealing faces beyond the steady state clearance is significantly greater than the force available to resist opening of the sealing faces beyond the steady state clearance.

Leakage across the sealing faces is reduced by reducing the clearance at which the seal operates. With reference to FIG. 6, it is therefore desirable to reduce the difference in clearance between the hydrostatic (non-rotating) and hydrodynamic (rotating) operating clearances.

In accordance with the invention, the difference between the clearances is reduced by the optimization of the groove parameters. Maximum pumping action occurs when the average groove angle d, as shown in FIG. 3, is at approximately 30°. The greater the pumping action, the greater the additional hydrodynamic opening force as compared to hydrostatic opening force. It is therefore desirable to reduce the difference between the hydrodynamic and hydrostatic opening forces by selection of a spiral groove angle d which is not at the optimum pumping angle. Therefore, a low angle in the range of 5°-15° or a high angle in the range of 60°-85° is desirable. A high angle has the added benefit of improving the bi-directionality of the seal. These groove angles should perform very well when the grooves extend from the outer periphery of the seal across 50% to 70% of the sealing face.

Figure 7:
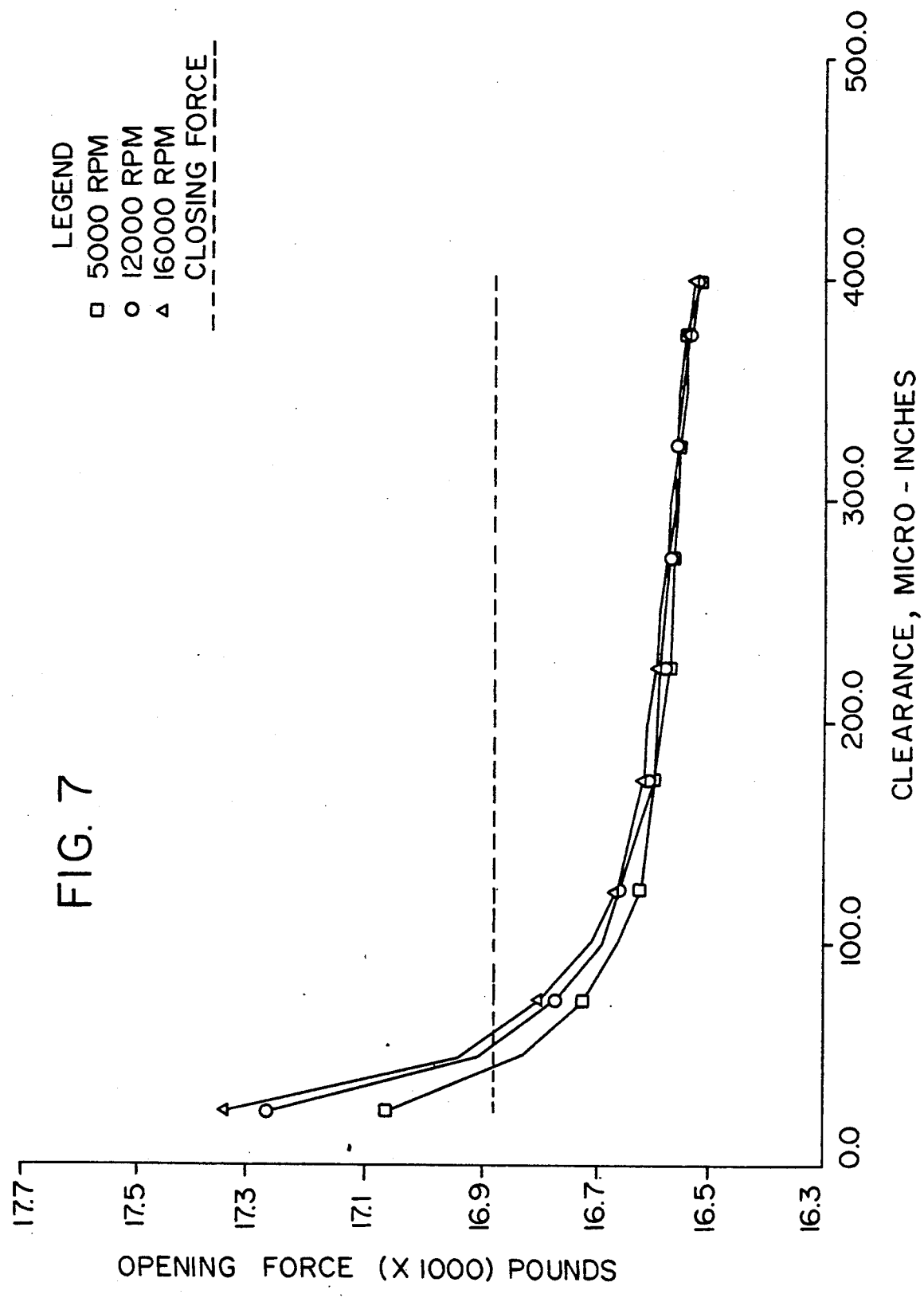
FIG. 7 is a force vs. clearance graph for a 7° spiral groove angle.

Computer simulation has been performed for low angle grooves. In a first embodiment, the grooves extended from the outside diameter 44 of the seal face 46 56% of the way across the sealing face toward the inside diameter 48. The remainder of the sealing face constituted dam 50, shown in FIG. 3. The groove depth was 300 micro inches, and the average groove angle 7°. At 1500 psig, the steady state clearance at 5,000 rpm was approximately 45 micro inches and at 16,000 rpm approximately 60 micro inches, as shown in FIG. 7. The leakage at 5,000 rpm was approximately 0.4 scfm, and the leakage at 16,000 rpm was approximately 0.9 scfm.

Figure 8:
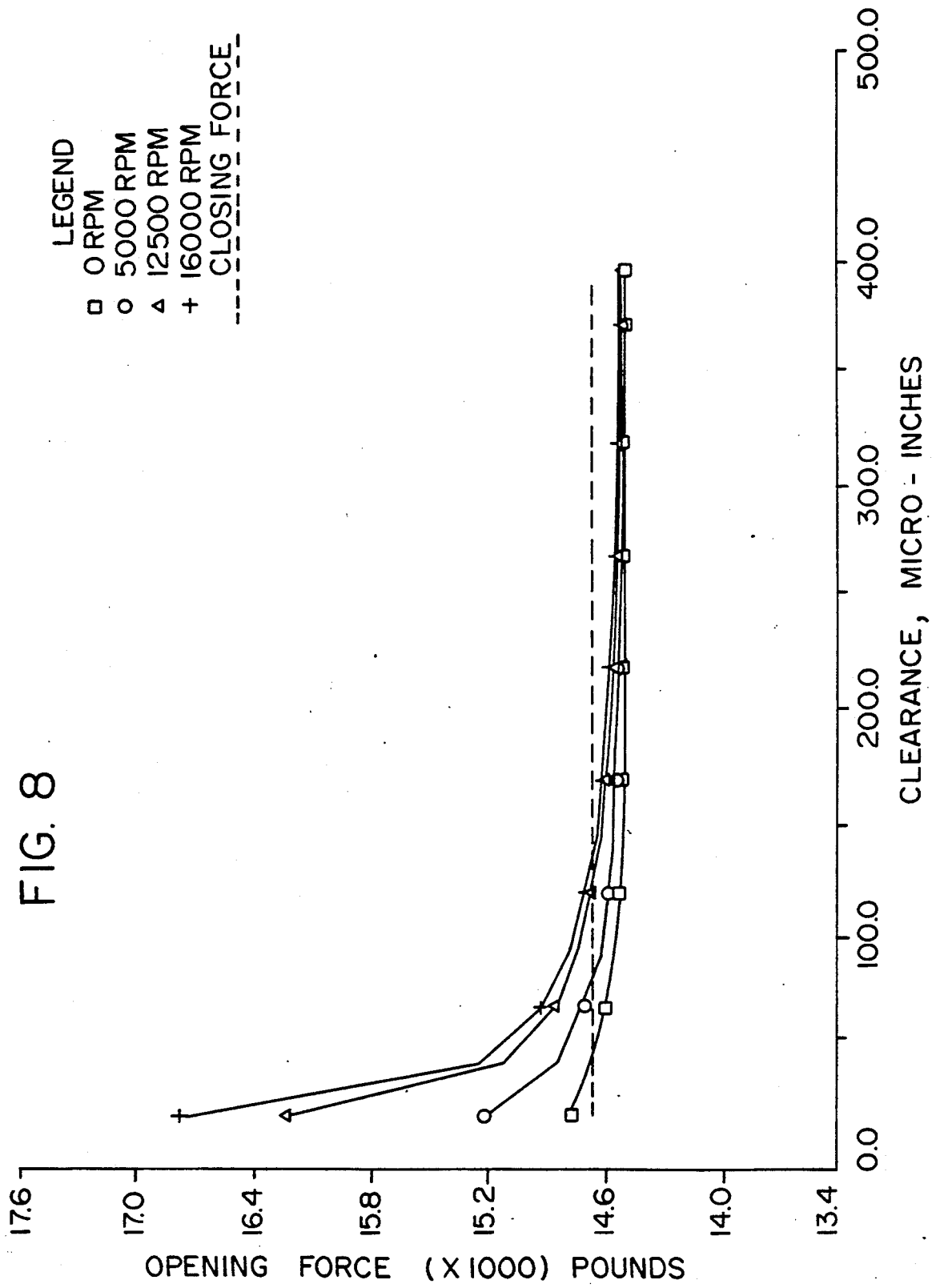
FIG. 8 is a force vs. clearance graph for a 15° spiral groove angle.

In a second embodiment, the average groove angle was 15°, the grooves extended across 60% of the sealing face, and the groove depth was 350 micro inches. At 1300 psig, the seal faces have a clearance of approximately 90 micro inches at 5,000 rpm and aproximately 140 micro inches at 16,000 rpm, as shown in FIG. 8. The leakage at 1300 psig and 5,000 rpm was approximately 1.5 scfm, and the leakage at 16,000 rpm was approximately 6.0 scfm.

Figure 9:
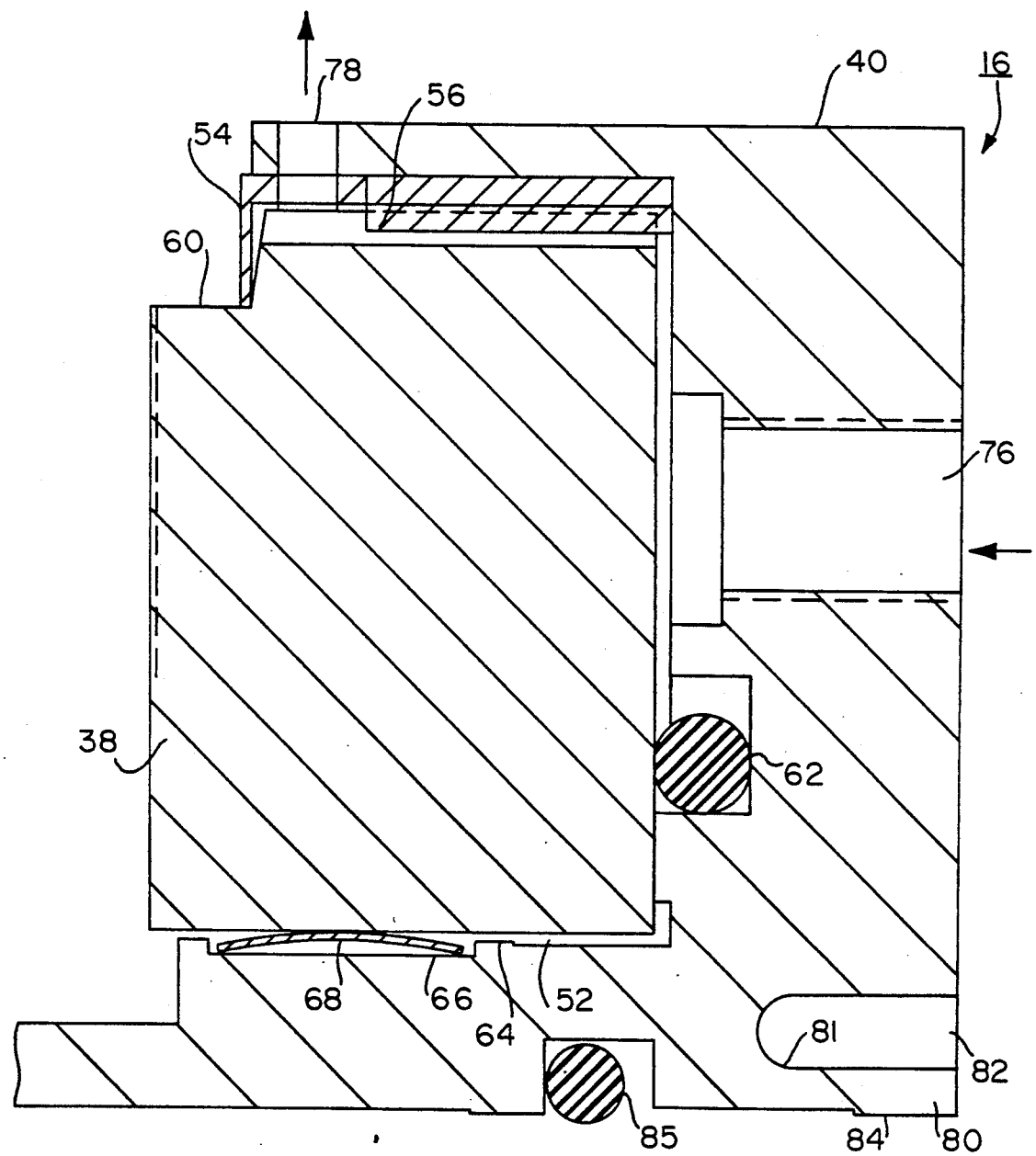
FIG. 9 is a detailed partial cross-sectional view of a rotary seal ring and carrier according to the invention.

In accordance with the invention, a device for holding the rotary seal ring in a rotary seal ring carrier is provided in the seal. As best shown in FIG. 9, the rotary seal ring carrier 40 of this invention is annular and has a pocket 52 with walls which surround the rotary seal ring 38. Furthermore, a cross-sectionally L-shaped annular spring clip press fits into the pocket, against the outer wall of the pocket and over the rotary seal ring. The L-shaped spring clip has radially inward protruding dents 56 formed therein which fit into grooves 58 (shown in FIG. 3) formed in the rotary seal ring. A portion of the L-shaped clip extends over a notch 60 formed in the outer edge of the rotary seal ring. The clip serves to press the seal ring against the "O" ring 62 positioned at the back of pocket 52. Dents 56 provide a dent drive which prevents the rotary seal ring from rotating within the rotary seal ring carrier. Additionally, the pocket and the L-shaped spring clip provide a method of retaining the rotary seal ring should catastrophic failure occur by preventing the rotary seal ring from escaping the pocket and damaging the machine. Thus, in the event of rotary seal ring failure, only replacement of the seal is required and not repair of machine components.

In accordance with the invention, an apparatus is provided for centering the rotary seal ring within the rotary seal ring carrier. If the seal ring abutted the inner wall 64 of the pocket 52 (i.e., the balance diameter) with no clearance, differential thermal expansion between the rotary seal ring material, usually silicon carbide, and the rotary seal ring carrier material, usually stainless steel or Inconel 625, would cause cracking of the rotary seal ring. Therefore, in this invention, an annular groove 66 is formed in the inner wall of the pocket and a finger spring 68 is placed in that groove. The finger spring, which is discussed in greater detail below, ensures that the rotary seal ring is centered within the seal ring carrier and that rotary seal ring does not crack as the rotary seal ring carrier expands relative to it.

In accordance with the invention, means are included to maintain the fit of the rotary seal ring carrier to the shaft regardless of differential thermal expansion therebetween. As embodied herein and shown in FIG. 1, the rotary seal assembly 16 also includes rotary seal ring carrier 40 having annular surface 70 extending from the carrier along shaft 18. The radially inner surface has a pair of annular pockets 72 formed at the front and rear of the annular surface 70. Finger springs 74 are located in those pockets.

Figure 10A:
FIGS. 10 (a) and (b) depict a finger spring.
Figure 10B:
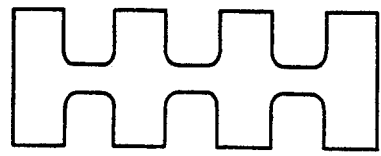

FIG. 10 depicts a finger spring. The spring is preferably made of spring steel and should be designed to have the proper radial stiffness for the weight of the carrier at maximum operating speed. The stiffness is preferably four to ten times the centrifugal unbalance force, per unit radial deflection. Thus, if the carrier at maximum speed would exert a radial centrifugal unbalance force of 40 lbs. per 0.001 inch deflection, the spring stiffness should be about 160 to 400 lbs. per 0.001 inch deflection. Thus, the device can very accurately center the rotary seal ring housing 40 on shaft 18, while allowing for differential thermal and centrifugal expansion.

Alternatively, the means of maintaining fit of the rotary ring carrier may comprise a spring portion 80 of the rotary seal ring carrier 40, as shown in FIG. 9. The spring portion is formed by creating an annular undercut region 82 in the carrier. Lip 84 serves to press against the shaft and compress portion 80, thus providing a spring fit to the shaft. Additionally, the spring portion 80 may be segmented in to multiple arc-like sections by a series of radial cuts 81. Since the majority of the mass of the rotary ring carrier is near the spring portion, no additional means for maintaining fit is required.

Regardless of whether finger springs or a spring portion is used to maintain the fit of the rotary seal ring carrier on the shaft, a means for sealing along the shaft is desired. In a preferred embodiment shown in FIG. 9, an "O" ring 85 is used which is disposed in a groove in the inner surface of the rotary seal ring carrier.

In accordance with the invention, as shown in FIG. 1, the rotary seal ring carrier may be provided with improved thermal isolation from the shaft. Thermal isolation is accomplished by an annular undercut 86 in annular surface 70. The undercut allows an insulating layer of air to exist between shaft 18 and carrier 40, and additionally, reduces the contact area between the shaft and the carrier. Thereby, the heat transfer is reduced.

In accordance with the invention, an apparatus is provided for cooling the rotary seal ring within its "cup type" retainer in order to reduce heat distortion of the sealing faces. A typical gas seal of the invention running at high speed and pressure could reach a temperature of approximately 400° F. in the gas adjacent to the retainer. The actual seal ring could get even hotter as it is somewhat insulated by the retainer. As shown in FIG. 9, the cooling apparatus consists of a series of holes 76 in the rotary seal ring carrier 40. These holes are slanted toward the direction of rotation at an angle of 35° to 45° from the plane of rotation. This orientation pumps gas into and around the back of the rotary seal ring and out vent holes 78 which are provided in the side of the rotary seal ring carrier. Preferably, 6 to 8 holes are provide which are circular in cross-section with a ⅛ to ⅜ inch diameter. Alternatively, vent openings may be provided in the axially orthogonal part of the "L" shaped spring clip 54.

In accordance with the invention, superior sealing may be achieved by combining multiple gas seals of the invention. FIG. 11 shows a tandem gas seal with a pressure step down across the first seal to the second seal. In order to obtain good pressure splitting in a tandem gas seal, it is desirable to have a very thin gas film in the seal adjacent to the high pressure gas, and a somewhat thicker gas film in the second seal due to the lower gas pressure at that seal and therefore the lower hydrostatic opening force preventing seal face contact. As an example, the first gas seal 88 may use a low groove angle such as 7°, and the second seal 90 uses a slightly larger groove angle such as 15°. These groove patterns were more fully discussed above as embodiments 1 and 2.

When pressure splitting tandem seals are used, a ball check valve should be provided to insure that the gas pressure between the seals does not exceed the process gas pressure. Additionally, in the tandem gas seal of FIG. 11, a segmented carbon seal 92 is provided as a leakage control seal.

Alternatively, a buffer gas may be injected between two gas seals in a face to face mounting arrangement. The buffer gas is particularly useful if the process gas is dirty or abrasive.

A safety feature which may be incorporated into the design of a gas seal is a labyrinth seal 94 (shown in FIG. 1) which is included along the seal and near a vent to stack. The labyrinth seal provides a tortuous path for the gas to follow should a failure in the gas seal occur. The labyrinth seal should have a flow of one-tenth or less that of the vent stack through which the gas can be disposed. In a case of catastrophic failure of the gas seal, the hot gases can be vented rather than rushing through the seal into oil. Without a labyrinth seal, a mixture of oxygenated gas entering the oil can result in a sudden explosion.

It will be apparent to those skilled in the art the various modifications and variations can be made to the improvements of the present invention and in construction of this seal without departing from the scope or spirit of the invention.

Other embodiments of the invention will be apparent to those skilled in the art from consideration of the specification and practice of the invention disclosed therein. It is intended that the specification and examples be considered as exemplary only, with a true scope and spirit of the invention being indicated by the following claims.

What is claimed is:

1. A dry-running seal, for seal for sealing a gas in a machine body, the seal having a stationary seal ring assembly and a rotary seal ring assembly attachable to a rotatable shaft, wherein
said rotary seal ring assembly comprises:
A. a rotary seal ring including: a sealing face at one end axial end of said rotary seal ring; a back face at the other axial end; at least one radially inner surface; and a radially outer surface having at least one axial groove formed therein;
B. spiral grooves formed in said sealing face of said rotary seal ring said grooves extending from the outside diameter of said sealing face of said rotary seal ring radially inward across 50 to 65% of said sealing face, said grooves having an average angle ranging from 5 to 15 degrees;
C. a rotary seal ring carrier including:
  i. an annular pocket formed in said rotary seal ring carrier for accepting said rotary seal ring, said pocket having a bottom, a radially inner, axially extending wall and a radially outer, axially extending wall;
  ii. an annular "L" shaped spring clip including an axially parallel portion having at least one radially inward protruding dent formed therein, and an axially orthogonal portion, said axially parallel portion adapted for press fitting against said radially outer wall of said pocket in said rotary seal ring carrier, said axially orthogonal portion extending over an annular notch in the outside diameter of said sealing face, and said dent fitting into said groove formed in said rotary seal ring;
  iii. an annular groove formed in said inner wall of said pocket formed in said rotary seal ring carrier; and
  iv. a finger spring located in said annular groove; and
D. a shaft attachment comprising:
  i. an extended annular portion of said rotary seal ring carrier, said extended annular surface adapted for fitting over said shaft, said extended annular portion having a radially inner surface adjacent to but spaced from said shaft for isolating said rotary seal ring carrier from heat in said shaft; and
  ii. means for maintaining the fit of said rotary seal ring carrier to said shaft regardless of relative thermal and centrifugal expansion therebetween.

2. The seal as claimed in claim 1 further comprising:
means for cooling the rotary seal ring including at least one pathway passing through said bottom of said rotary ring carrier for providing a fluid communication of the gas to said pocket of said seal ring carrier, said pathway being slanted toward the direction of rotation, whereby gas is drawn into said pocket when the rotary seal ring is rotating; and means for venting said gas from said pocket.

3. The seal as claimed in claim 2 further comprising sealing means positioned inwardly of said at least one pathway and between the back face of said rotary seal ring and the bottom of said pocket for preventing the flow of drawn gas beyond said sealing means.

4. The seal as claimed in claim 3 wherein said means for venting includes at least one hole formed in said seal ring carrier.

5. A rotary seal ring assembly for a dry-running gas seal, the assembly comprising:
I. a rotary seal ring; and
II. a rotary seal ring carrier including:
  A. an annular pocket formed in said rotary seal ring carrier for accepting said rotary seal ring, said pocket having a bottom, a radially inner, axially extending wall and a radially outer, axially extending wall; and
  B. an annular "L" shaped spring clip including an axially parallel portion having radially inward protruding dents formed therein, and an axially orthogonal portion, said axially parallel portion adapted for press fitting against said radially outer wall of said pocket in said rotary seal ring carrier, and said axially orthogonal portion adapted for extending over the outside diameter of said sealing face;
whereby said pocket and said "L" shaped spring clip combine to contain said rotary seal ring in the event of a catastrophic failure.

6. The rotary seal assembly of claim 5 further comprising an "O" ring located in the bottom of said pocket between said rotary seal ring and said rotary seal ring carrier and wherein said axially orthogonal portion of said "L" shaped spring clip serves to press said rotary seal ring against said "O" ring.

7. A rotary seal ring carrier for holding a rotary seal ring in a dry-running gas seal, the carrier comprising:
an annular body;
an annular pocket formed in said annular body for holding the rotary seal ring, said pocket having a bottom, a radially inner wall and a radially outer wall;
an annular groove formed in said radially inner wall of said pocket; and
a finger spring located in said annular groove, said finger spring having an annular center section and including axially projecting fingers extending therefrom;
whereby said finger spring serves to center the rotary seal ring regardless of relative thermal expansion between the rotary seal ring and said rotary seal ring carrier.

8. A shaft attachment system for attaching a rotary seal ring carrier to a shaft, the attachment system comprising:
an extended annular portion of the ring carrier, said portion extending along the shaft and adapted for fitting over the shaft, said extended annular portion having a radially inner surface adjacent to but spaced from the shaft;
means for maintaining the fit of said rotary seal ring carrier to said shaft regardless of the relative thermal and centrifugal expansion therebetween,
wherein said extended portion has a first axial end and a second axial end axially opposite said first end, said means for maintaining fit comprising a first annular finger spring pocket formed in said radially inner surface adjacent to said first end and a second annular finger spring formed in said radially inner surface adjacent to said second end, and annular finger springs located in said finger spring pockets for pressing against the shaft and the radially inner surface of said extended annular portion and holding them in place.

9. A gas seal for sealing a gas, the seal having a rotary seal ring and a rotary seal ring carrier, said seal ring and carrier rotatable in a plane of rotation about a shaft, said seal comprising:

an annular pocket formed in said rotary seal ring carrier for holding said rotary seal ring, said pocket having a bottom, a radially inner, axially extending wall and a radially outer, axially extending wall;

means for cooling the seal ring including at least one pathway passing through said bottom of said seal ring carrier and providing a fluid communication of the gas to the pocket of said seal ring carrier, said pathway being slanted toward the direction of rotation, whereby gas is drawn into said pocket when the rotary seal ring is rotating; and means for venting the gas from said pocket.

10. The seal as claimed in claim 9 further comprising sealing means position inwardly of said at least one pathway and between the back face of said rotary seal ring and the bottom of said pocket for preventing the flow of drawn gas beyond said sealing means.

11. The seal as claimed in claim 10 wherein said means for venting includes at least one hole formed in said seal ring carrier.

12. The seal as claimed in claim 9 wherein said pathway is slanted at 30 to 45 degrees from the plane of rotation.

* * * * *